US012026543B2

(12) United States Patent
Hu

(10) Patent No.: US 12,026,543 B2
(45) Date of Patent: Jul. 2, 2024

(54) COOPERATIVE COMPUTING DEVICE AND COOPERATIVE COMPUTING METHOD THEREOF

(71) Applicant: AVerMedia Technologies, Inc., New Taipei (TW)

(72) Inventor: Chao-Tung Hu, New Taipei (TW)

(73) Assignee: AVERMEDIA TECHNOLOGIES, INC., New Taipei (TW)

( * ) Notice: Subject to any disclaimer, the term of this patent is extended or adjusted under 35 U.S.C. 154(b) by 213 days.

(21) Appl. No.: 17/517,728

(22) Filed: Nov. 3, 2021

(65) Prior Publication Data
US 2022/0147383 A1 May 12, 2022

(30) Foreign Application Priority Data
Nov. 6, 2020 (TW) .................. 109138791

(51) Int. Cl.
*G06T 1/20* (2006.01)
*G06F 7/24* (2006.01)
*G06F 9/48* (2006.01)
*G06F 9/50* (2006.01)
*G06F 11/30* (2006.01)

(52) U.S. Cl.
CPC .............. *G06F 9/4843* (2013.01); *G06F 7/24* (2013.01); *G06F 9/505* (2013.01); *G06F 11/3024* (2013.01); *G06T 1/20* (2013.01); *G06F 2209/5017* (2013.01)

(58) Field of Classification Search
CPC .......... G06F 9/4843; G06F 7/24; G06F 9/505; G06F 11/3024; G06F 11/3433; G06T 1/20
See application file for complete search history.

(56) References Cited

U.S. PATENT DOCUMENTS

| 2018/0040094 | A1* | 2/2018 | Liu | G06F 16/951 |
| 2018/0040096 | A1* | 2/2018 | Benthin | G06F 13/1652 |
| 2018/0329746 | A1* | 11/2018 | Park | G06T 1/20 |
| 2019/0102859 | A1* | 4/2019 | Hux | G06T 1/20 |

OTHER PUBLICATIONS

Abraham et al.; A load-balancing strategy for sort-first distributed rendering; IEEE; 2004 (Year: 2004).*
El-Mahdy et al.; An Efficient Load-Balancing Algorithm for Image Processing Applications on Multicore Processors; ACM; 2008 (Year: 2008).*

* cited by examiner

*Primary Examiner* — Corey S Faherty
(74) *Attorney, Agent, or Firm* — McClure, Qualey & Rodack, LLP

(57) ABSTRACT

The present invention discloses a cooperative computing device, wherein a task dispatching module receives a plurality of original image frames and dynamically dispatches the original image frames as a first amount of original image frames and a second amount of original image frames based on a loading result. A first computing module and a second computing module, which are of different types, respectively receive the first amount and the second amount of original image frames and respectively generate a first amount and a second amount of processed image frames. An image sorting module receives the first amount and the second amount of processed image frames, sorts and recovers the processed image frames based on a first timing sequence, and generating the loading result. The present invention also discloses a cooperative computing method which corresponds to the cooperative computing device.

6 Claims, 3 Drawing Sheets

COOPERATIVE COMPUTING DEVICE AND COOPERATIVE COMPUTING METHOD THEREOF

CROSS REFERENCE TO RELATED APPLICATIONS

This Non-provisional application claims priority under 35 U.S.C. § 119(a) on Patent Application No. 109138791 filed in Republic of China on Nov. 6, 2020, the entire contents of which are hereby incorporated by reference.

BACKGROUND

1. Technical Field

The invention relates to a device and method for cooperative computing, and particularly, to a device and method for cooperative computing between two different types of processors.

2. Description of Related Art

At present, artificial intelligence (AI) has been widely used in various scientific and technological applications, for example, in the use of face recognition. The artificial intelligence calculation of face recognition requires number crunching by the central processing unit (CPU) and the graphics processing unit (GPU). However, when the CPU and GPU perform number crunching, it will consume calculation time and cause a time delay, so that graphics calculations cannot be completed in real time and images cannot be displayed in real time.

In order to allow the CPU and GPU to perform operations more efficiently, the prior art proposes at least two methods. In the first prior art, the CPU and the GPU are used to perform different types of operations, for example, the CPU is used to perform logic operations, and the GPU is used to perform rendering operations at the same time. In the second prior art, the CPU and GPU are combined into a unified streaming processing resource pool, and then the original frame generated by rendering is segmented and distributed to the CPU and GPU for streaming processing of video streams, and then integrated and converted into an animated video stream.

However, in the actual operation of the above-mentioned prior art, the respective computing capabilities or load conditions of the CPU and GPU are different, and it may be overly dependent on one of the CPU and GPU to perform operations, causing the other to be excessively idle, resulting in the resource waste of CPU or GPU operations so as to unable to optimize the use of CPU or GPU hardware performance.

Based on the above-mentioned problems in the prior art, there is a requirement for an improved cooperative computing device and cooperative computing method, which can distribute computing tasks to two different types of computing modules (such as CPU computing module and GPU computing modules) with a better allocation mechanism to execute separately, and being able to take into account the computing capabilities of the two computing modules, and making full use of the hardware performance of the two computing modules without idle or wasting computing resources is an important subject matter in this field.

SUMMARY OF THE INVENTION

In order to overcome the technical problems existing in the prior art, the purpose of the present invention is to provide an improved technical solution of a cooperative computing device and a cooperative computing method, which can effectively utilize the hardware performance of the two computing modules, such as a CPU computing module and a GPU computing module, with a better dispatching mechanism.

To achieve the above, the cooperative computing device includes a task dispatching module, a first computing module, a second computing module and an image sorting module. The task dispatching module receives a plurality of the original image frames and a loading result respectively, wherein each original image frame is corresponding to a first timing sequence. The task dispatching module also dynamically dispatches the original image frames to a first amount of original image frames and a second amount of original image frames according to the loading result. The first computing module, which is electrically connected to the task dispatching module, receives the first amount of original image frames and generates a first amount of processed image frames. The second computing module, which is electrically connected to the task dispatching module, receives the second amount of original image frames and generates a second amount of processed image frames. The image sorting module is electrically connected to the task dispatching module, the first computing module and the second computing module. The image sorting module receives the first amount of processed image frames and the second amount of processed image frames, and sorts and recovers the processed image frames according to the first timing sequence, and generates the loading result. Among them, the first computing module and the second computing module are different types of computing modules, and the image sorting module dynamically determines the loading result according to the computing capabilities or load conditions of the first computing module and the second computing module.

In one embodiment, the first computing module is a central processing unit (CPU) computing module, and the second computing module is a graphics processing unit (GPU) computing module.

In one embodiment, the image sorting module determines the respective computing power or load status of the first computing module and the second computing module to determine the loading result based on the time required for the first computing module and the second computing module to generate each of the processed image frames.

In one embodiment, the ratio of the second amount and the first amount is related to the ratio of the time required for the first computing module and the second computing module to generate each processed image frame.

In one embodiment, the cooperative computing device also includes an image capturing module and an image outputting module. The image capturing module, which is electrically connected to the task dispatching module, captures images for at least one target and generates the original image frames. The image outputting module, which is electrically connected to the image sorting module, receives the processed image frames after sorting and recovering.

In one embodiment, the first computing module or the second computing module calculates the coordinate position of at least one characteristic part of the target, and the image sorting module transmits the coordinate position of the characteristic part to the task dispatching module.

To achieve the above, the invention also provides a cooperative computing method, which includes the following steps. Step 1 is to receive a plurality of original image frames, and each original image frame corresponds to a first timing sequence. Step 2 is to receive a loading result, which represents the respective computing power or loading status of a first computing module and a second computing module, where the first computing module and the second computing module are different types of computing modules. Step 3 is to dynamically dispatch the original image frames into a first amount of original image frames and a second amount of original image frames based on the loading result. Step 4 is to dispatch the first amount of original image frames to the first computing module and dispatch the second amount of original image frames to the second computing module. Step 5 is to process the first amount of original image frames by the first computing module and generate a first amount of processed image frames. Step 6 is to process the second amount of original image frames by the second computing module and generate a second amount of processed image frames. Step 7 is to sort and recover the first amount and the second amount of processed image frames based on the first timing sequence.

In one embodiment, the ratio of the second amount and the first amount is related to the ratio of the time required for the first computing module and the second computing module to generate each processed image frame.

In one embodiment, the cooperative computing method further includes the steps of capturing images for at least one target, calculating the coordinate position of at least one characteristic part of the target, and transmitting the coordinate position of the characteristic part before the step of receiving the original image frames. And, outputting the sorted and recovered processed image frames to other modules or other components after the step of sorting and recovering the first amount and the second amount of processed image frames.

In one embodiment, the coordinate position of at least one characteristic part of the target is further transmitted to at least one of the first computing module and the second computing module.

As mentioned above, the cooperative computing device and the cooperative computing method of the invention can dynamically dispatch the ratio of the amount of image frames distributed to the two computing modules during the next operation based on the respective load conditions of the first computing module (such as the CPU computing module) and the second computing module (such as the GPU computing module) during the previous operation, so as to balance the load of the two computing modules, and effectively use the hardware performance of the two computing modules without wasting or idling the hardware resources.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

Reference will now be made to the drawings to describe various inventive embodiments of the present disclosure in detail, wherein like numerals refer to like elements throughout.

Figure 1:
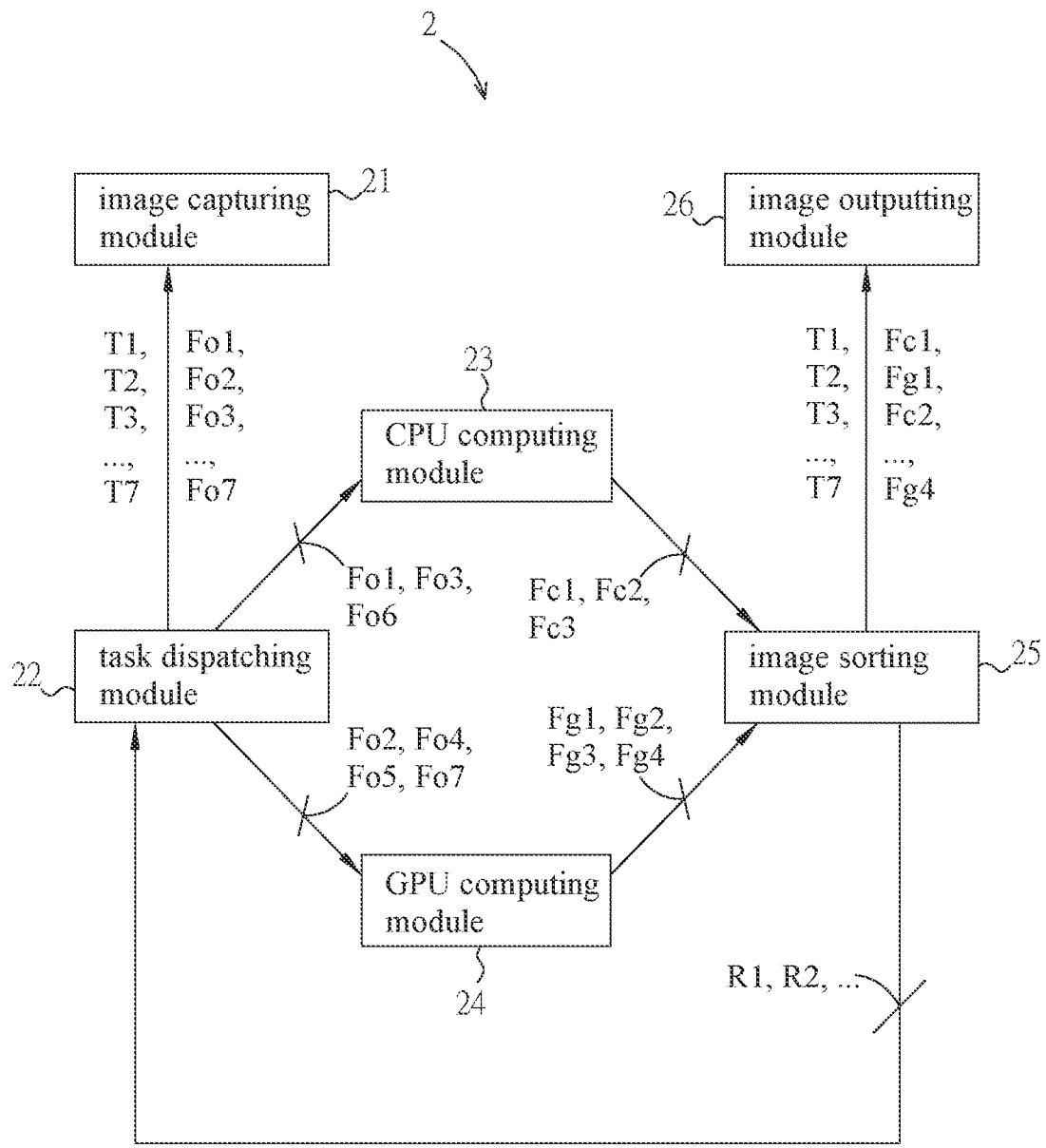
FIG. 1 is a block diagram showing the cooperative computing device according to the first embodiment of the invention.

FIG. 1 is a block diagram showing a cooperative computing device 2 according to the first embodiment of the invention. As shown in FIG. 1, the cooperative computing device 2 may include an image capturing module 21, a task dispatching module 22, a first computing module 23, a second computing module 24, an image sorting module 25, and an image outputting module 26. In the embodiment, the first computing module 23 is a CPU computing module, and the second computing module 24 is a GPU computing module, which will be referred to as a cross-reference hereinafter.

The image capturing module 21 can be a Webcam or an image capture card, which captures images for a target and outputs the original image frames Fo1, Fo2, Fo3 . . . Fo7 . . . which have not been processed. Among them, the arrangement sequence of the original image frames Fo1, Fo2, Fo3 . . . Fo7 is the first timing sequence: T1, T2, T3, T4, T5, T6, T7. The image capturing module 21 is electrically connected to the task dispatching module 22, and the image capturing module 21 transmits the original image frames Fo1, Fo2, Fo3 . . . Fo7 . . . to the task dispatching module 22.

The task dispatching module 22 is electrically connected to the image capturing module 21, CPU computing module 23, GPU computing module 24 and the image sorting module 25, respectively. The task dispatching module 22 receives the loading result R1 of the previous operation (or previous timing sequence) from the image sorting module 25. The loading result R1 represents the respective computing load conditions of the CPU computing module 23 and the GPU computing module 24 in the previous operation. The task dispatching module 22 decides how to dispatch the original image frames Fo1, Fo2, Fo3 . . . Fo7 . . . to the CPU computing module 23 and the GPU computing module 24 for processing in the next operation (or currently operation) according to the loading result R1.

It is to be noted that the original image frames Fo1, Fo2, Fo3 . . . Fo7 . . . mentioned above are only an example, and it expresses that the original image frames are multiple continuous image frames. In addition, the above-mentioned symbols of the original image frames Fo1, Fo2, Fo3 . . . Fo7 . . . are used only for the convenience of description, and do not mean that the original image frame is the same at different operating period.

If the loading result R1 of the previous operation period indicates that the time Tc for the CPU computing module 23 to process each image frame is longer, and the time Tg for the GPU computing module 24 to process each image frame is shorter, it means the CPU computing module 23 has poor image processing performance, or the CPU computing module 23 is overload during the previous operation period, which requires a long processing time. In other words, the time Tc for the CPU computing module 23 to process each image frame is greater than the time Tg for the GPU computing module 24 to process each image frame, that is, Tc>Tg. In response to the loading result R1 mentioned above, in the next operation period, the task dispatching module 22 will dispatch a larger number of original image frames to the GPU computing module 24 to reduce the load of the CPU computing module 23, so as to achieve the load-balance and optimize the performance of the cooperative operation of the CPU computing module 23 with the GPU computing module 24.

Conversely, if the time Tc of the CPU computing module 23 to process each image frame is less than the time Tg of the GPU computing module 24 to process each image frame, that is, Tc<Tg, it means the image of the CPU computing module 23 has better image processing efficiency, or the CPU computing module 23 has a lower load during the previous operation period, so it only needs a short processing time period to complete the image processing. In response to the loading result R1 mentioned above, in the next operation period, the task dispatching module 22 will dispatch a larger amount of original image frames to the CPU computing module 23.

In the first embodiment of the invention, the task dispatching module 22 can determine the ratio of the time required by the CPU computing module 23 and the GPU computing module 24 to process each image frame during the previous operation period to determine the number of image frames dispatched to the CPU computing module 23 and the GPU computing module 24 in the next operation period. Further explanation, the ratio of the time required by the CPU computing module 23 and the GPU computing module 24 may include the ratio of the time required for the CPU computing module 23 divided by the GPU computing module 24 or the ratio of the time required for the GPU computing module 24 divided by the CPU computing module 23.

TABLE 1

|  | Number of image frames that can be processed | Required processing time | Processing time/ number of image frames |
| --- | --- | --- | --- |
| CPU computing module | 3 frames | 12 ms | 4 ms/frame |
| GPU computing module | 5 frames | 15 ms | 3 ms/frame |

For example, as shown in Table 1, the loading result R1 of the previous operation period indicates that the processing time required for the CPU computing module 23 to process three frames is 12 milliseconds (ms), while the processing time required for the GPU computing module 24 to process five frames is 15 ms. At this time, the ratio of the time required for CPU computing module 23 and GPU computing module 24 to process each image frame is 12/3:15/5=4:3. In response to the loading result R1 and processing time ratio mentioned above, in the next operation period, the ratio of the amount of image frames distributed by the task dispatching module 22 to the CPU computing module 23 and GPU computing module 24 is 3:4.

Based on the ratio of the amount of image frames mentioned above is 3:4, the task dispatching module 22 dispatches the original image frames Fo1, Fo2, Fo3 . . . Fo7 . . . received from the image capturing module 21, therefore, the task dispatching module 22 dispatches the first amount of image frames (three frames) to the CPU computing module 23, and dispatches the second amount of image frames (four frames) to the GPU computing module 24. In the embodiment, the task dispatching module 22 dispatches the frames in the manner of interval selection that the three image frames Fo1, Fo3, and Fo6 are dispatched to the CPU computing module 23 and the four image frames Fo2, Fo4, Fo5, and Fo7 are dispatched to the GPU computing module 24. In another embodiment, the task dispatching module 22 can also dispatch the frames in the manner of segment selection that the three image frames Fo1, Fo2, and Fo3 are dispatched to the CPU computing module 23 and the four image frames Fo4, Fo5, Fo6, Fo7 are dispatched to GPU computing module 24. In further embodiments, the task dispatching module 22 can also dispatch the frames in the manner of randomly choose that the three image frames Fo1, Fo5, and Fo6 are dispatched to the CPU computing module 23 and the four image frames Fo2, Fo3, Fo4, and Fo7 are dispatched to the GPU computing module 24. In other words, the task dispatching module 22 only needs to dispatch image frames according to the ratio of the amount of image frames obtained by calculation, and is not limited to how to select frames.

Then, the CPU computing module 23 and the GPU computing module 24 process the received image frames respectively. Among them, the CPU computing module 23 processes the original image frames Fo1, Fo3, and Fo6, and the image frames after processing are the processed image frames Fc1, Fc2, and Fc3, and then the CPU computing module 23 transmits the processed image frames Fc1, Fc2, and Fc3 to the image sorting module 25. In addition, the GPU computing module 24 processes the original image frames Fo2, Fo4, Fo5, and Fo7, and the image frames after processing are the processed image frames Fg1, Fg2, Fg3, Fg4, and then the GPU computing module 24 transmits the processed image frames Fg1, Fg2, Fg3, Fg4 to the image sorting module 25.

The difference between the invention and the conventional technology is that the CPU computing module of the conventional technology specializes in processing logical operation processing, while the GPU computing module specializes in processing rendering operation processing. However, in the invention, each of the CPU computing module 23 and the GPU computing module 24 is fully responsible for the logical operation processing and rendering operation processing of the entire image frame. For example, the CPU computing module 23 is fully responsible for the logical operation processing and rendering operation processing of the entire frame of the original image frames Fo1, Fo3 and Fo6, while the GPU computing module 24 is fully responsible for the logical operation processing and rendering operation processing of the original image frames Fo2, Fo4, Fo5 and Fo7.

More specifically, in one embodiment, the CPU computing module 23 and the GPU computing module 24 of the invention can perform artificial intelligence (AI) operations, such as performing face recognition operations in the image frame. After the CPU computing module 23 and the GPU computing module 24 perform face recognition, the position or coordinates of the face in the image frame can be located (or recorded). The above position or coordinates can be returned to the task dispatching module 22 for reference for face recognition in the next operation period. For example, in the next operation, the position of the face or the area near the coordinates can be scanned first to save the calculation time.

The image sorting module 25 is electrically connected to the CPU computing module 23, the GPU computing module 24, the task dispatching module 22, and the image outputting module 26, respectively. The image sorting module 25 receives the image frames Fc1, Fc2, and Fc3 processed by the CPU computing module 23 from the CPU computing module 23. In addition, the image sorting module 25 also receives the image frames Fg1, Fg2, Fg3, and Fg4 processed by the GPU computing module 24 from the GPU computing module 24. The image sorting module 25 sorts and recovers the image frames Fc1, Fc2, Fc3 and Fg1, Fg2, Fg3, Fg4 according to the original arrangement order of the image frames (Fo1, Fo2, Fo3, . . . Fo7, . . . ). The detailed description is as follows.

Figure 2:
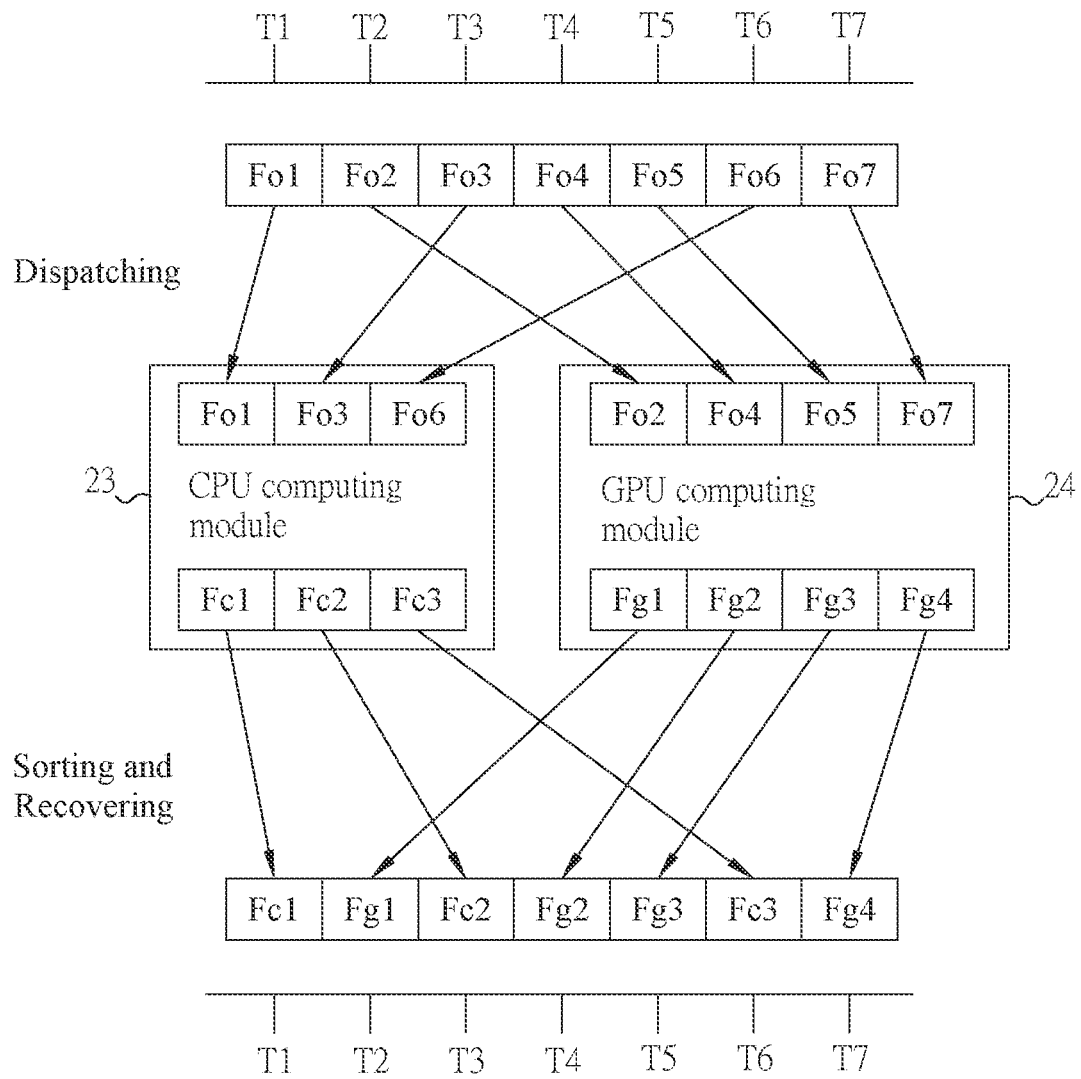
FIG. 2 is a schematic diagram showing the sorting and recovering of the image frame according to the image sorting module of the first embodiment of the invention.

FIG. 2 is a schematic diagram showing sorting and recovering the image frames by the image sorting module 25 according to the first embodiment of the invention. As shown in FIG. 2, the image frames Fc1, Fc2, and Fc3 processed by the CPU computing module 23 is corresponding to the original image frames Fo1, Fo3, and Fo6 before processing, so the time points of the original sequence of the image frames Fc1, Fc2, and Fc3 processed by the CPU computing module 23 are corresponding to T1, T3, and T6, respectively.

In addition, the image frames Fg1, Fg2, Fg3 and Fg4 processed by the GPU computing module 24 is corresponding to the original image frames Fo2, Fo4, Fo5, and Fo1 before processing, so the time points of the original sequence of the image frames Fg1, Fg2, Fg3 and Fg4 processed by the GPU computing module 24 are corresponding to T2, T4, T5, and T7, respectively.

According to the sequence (i.e. the first timing sequence T1, T2, T3, T4, T5, T6, and T7) of the original image frames, the image sorting module 25 reorders the image frames Fc1, Fc2, Fc3, Fg1, Fg2, Fg3, and Fg4 to the image frames Fc1, Fg1, Fc2, Fg2, Fg3, Fc3, and Fg4. Finally, as shown in FIG. 1, the image sorting module 25 transmits the image frames Fc1, Fg1, Fc2, Fg2, Fg3, Fc3, and Fg4 after the restoration sequence (i.e. reordering) to the image outputting module 26.

In addition, the image sorting module 25 judges the processing capacity, processing speed, or load condition of the CPU computing module 23 and the GPU computing module 24 during this operation period according to the processing time for each image frame by the CPU computing module 23 and the GPU computing module 24. The above judging result is expressed as the loading result R2. The image sorting module 25 feeds back the loading result R2 of this operation period to the task dispatching module 22 so that the task dispatching module 22 dispatches the number of image frames that should be processed separately by the CPU computing module 23 and the GPU computing module 24 during the next operation period according to the loading result R2.

In addition, the image sorting module 25 also records the position of the face located in each image frame by the CPU computing module 23 and the GPU computing module 24 during this operation period, and the image sorting module 25 feeds back the face location result to the task dispatching module 22. The task dispatching module 22 transmits the face location result to the CPU computing module 23 and the GPU computing module 24 for reference so that the CPU computing module 23 and the GPU computing module 24 preferentially scan the area near the coordinates of the face location result when executing the AI recognition algorithm in the next operation period.

Figure 3:
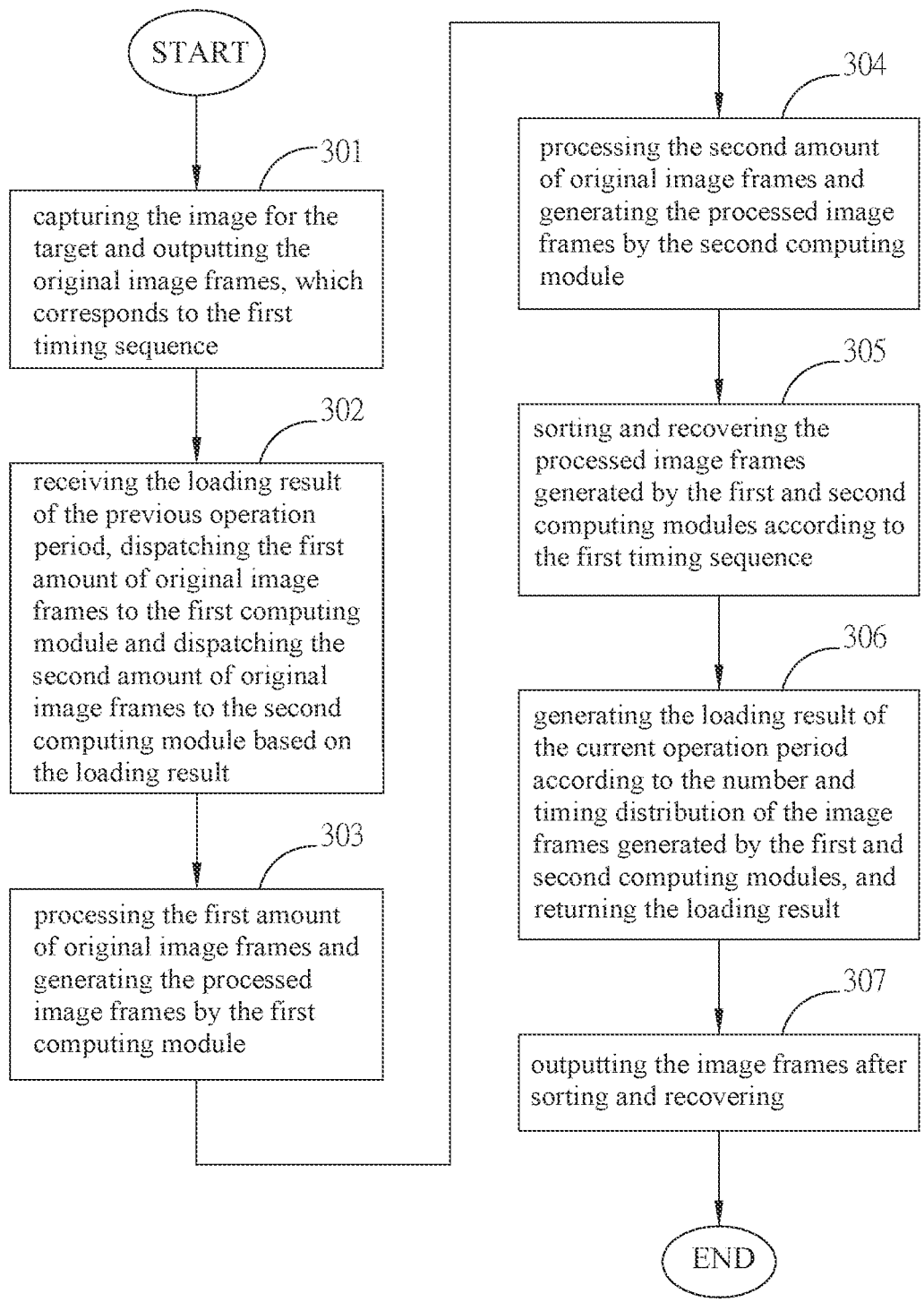
FIG. 3 is a schematic flowchart showing the cooperative computing method according to the second embodiment of the invention.

FIG. 3 is a flowchart of the cooperative computing method according to the second embodiment of the invention. As shown in FIG. 3, the cooperative computing method of the second embodiment includes steps 301 to 307. Please refer to FIG. 1 to FIG. 3 for the following description.

First, step 301 is to capture an image for at least one target. The target is, for example, a person, which includes the characteristic part (for example, a part of a human face). Step 301 is further to output the original image frames Fo1, Fo2, Fo3 . . . Fo7 corresponding to each time point in accordance with the first timing sequence (for example, the time points T1, T2, T3, T4, T5, T6, and T7). Step 301 can be performed by the image capturing module 21 described in the first embodiment.

Then, step 302 is to receive the loading result R1 of the previous operation period, and dispatch the original image frames Fo1, Fo2, Fo3 . . . Fo7 to the first computing module (i.e., the CPU computing module 23) or the second computing module (i.e., the GPU computing module 24) according to the loading result R1. For example, the loading result R1 of the previous operation period is shown in Table 1 above. The processing time required for the CPU computing module 23 to process 3 frames is 12 ms, while the GPU computing module 24 processes 5 frames is 15 ms. Therefore, the ratio of the time required for the CPU computing module 23 and the GPU computing module 24 to process each image frame is 12/3:15/5=4:3. Then, in the next operation period, the ratio of the amount of image frames dispatched by the task dispatching module 22 to the CPU computing module 23 and the GPU computing module 24 is 3:4. Therefore, the task dispatching module 22 dispatches the first amount of image frames Fo1, Fo3, and Fo6 (3 frames) to the CPU computing module 23, and dispatches the second amount of image frames Fo2, Fo4, Fo5 and Fo7 (4 frames) to the GPU computing module 24.

Next, step 303 is to process the first amount of original image frames Fo1, Fo3, and Fo6 after being dispatched, for example, logical calculation and rendering calculation are performed. The above calculation can be performed by the CPU computing module 23. The image frames after processing are the processed image frames Fc1, Fc2, and Fc3, which are transmitted to the image sorting module 25.

Then, or at the same time as step 303, step 304 is to process the second amount of original image frames Fo2, Fo4, Fo5, and Fo7 by the GPU computing module 24 after being dispatched, for example, logical calculation and rendering calculation are performed. The image frames after processing are the processed image frames Fg1, Fg2, Fg3, and Fg4, which are transmitted to the image sorting module 25.

Next, step 305 is to sort and recover the processed image frames Fc1, Fc2, Fc3, Fg1, Fg2, Fg3, and Fg4. For example, referring to FIG. 2 at the same time, the original image frames Fo1, Fo2, Fo3 . . . Fo7 output in step 301 corresponds to the first timing sequence T1, T2, T3, T4, T5, T6, and T7, respectively. Therefore, the processed image frames Fc1, Fc2, Fc3, Fg1, Fg2, Fg3, and Fg4 can be sorted and recovered according to the timing sequence T1, T2 . . . T7, and the order of the sorted and recovered image frames are the image frames Fc1, Fg1, Fc2, Fg2, Fg3, Fc3, and Fg4 shown in FIG. 2. Step 305 can be performed by the image sorting module 25 described in the first embodiment.

Then, or at the same time as step 305, in step 306, it is possible to determine the computing power and load status of the CPU computing module 23 and the GPU computing module 24 during current operation period according to the number and timing distribution of the received image frames Fc1, Fc2, Fc3, Fg1, Fg2, Fg3, and Fg4. The above judging result is represented by the loading result R2, and the loading result R2 will be returned to the task dispatching module 22. The task dispatching module 22 then dynamically dispatches different numbers of image frames to the CPU computing module 23 and the GPU computing module 24 in the next operation period according to the loading result R2.

Finally, in step 307, the sorted and recovered image frames Fc1, Fg1, Fc2, Fg2, Fg3, Fc3, and Fg4 are output for subsequent image processing. For example, the image frames Fc1, Fg1, Fc2, Fg2, Fg3, Fc3, Fg4 are output to the image outputting module 26 of the first embodiment.

According to the above-mentioned operation of the cooperative computing device 2 and the steps of the cooperative computing method, it can be known that the invention can dynamically dispatch the ratio of the amount of image frames distributed to the first computing module and the second computing module immediately based on the respective computing power or load status of the first computing module (i.e., the CPU computing module 23) and the second computing module (i.e., the GPU computing module 24) during the previous operation, so that the first computing module and the second computing module can balance their operation load with each other, so as to avoid overloading a single computing module while leaving another computing module idle so that the cooperative computing device can achieve the best computing performance. This is the technical effect achieved by the invention.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. A cooperative computing device, comprising:
   a task dispatching module, receiving a plurality of original image frames and a loading result, which are corresponding to a first timing sequence, and dynamically dispatching the original image frames as a first amount of original image frames and a second amount of original image frames base on the loading result;
   a first computing module, which is electrically connected to the task dispatching module, and receives the first amount of original image frames to generate a first amount of processed image frames;
   a second computing module, which is electrically connected to the task dispatching module, and receives the second amount of original image frames to generate a second amount of processed image frames; and
   an image sorting module, which is electrically connected to the task dispatching module, the first computing module and the second computing module, receiving the first amount of processed image frames and the second amount of processed image frames, sorting and recovering the first amount of processed image frames and the second amount of processed image frames based on the first timing sequence, and generating the loading result,
   wherein the first computing module and the second computing module are different types of computing modules, and the image sorting module dynamically determining the loading result based on the computing capabilities or the load conditions of the first computing module and the second computing module.

2. The cooperative computing device of claim 1, wherein the first computing module is a CPU computing module, and the second computing module is a GPU computing module.

3. The cooperative computing device of claim 1, wherein the image sorting module determines the respective computing power or load status of the first computing module and the second computing module to determine the loading result based on the time required for the first computing module and the second computing module to generate each of the processed image frames.

4. The cooperative computing device of claim 3, wherein the ratio of the second amount and the first amount is related to the ratio of the time required for the first computing module and the second computing module to generate each processed image frame.

5. The cooperative computing device of claim 1, further comprising:
   an image capturing module, which is electrically connected to the task dispatching module, captures images for at least one target and generates the original image frames; and
   an image outputting module, which is electrically connected to the image sorting module, receives the processed image frames after sorting and recovering.

6. The cooperative computing device of claim 1, wherein the first computing module and/or the second computing module calculates the coordinate position of at least one characteristic part of the target, and the image sorting module transmits the coordinate position of the characteristic part to the task dispatching module.

\* \* \* \* \*